United States Patent [19]

Nygards

[11] Patent Number: 5,000,629
[45] Date of Patent: Mar. 19, 1991

[54] SELF-CENTERING PLASTIC PIPE ROUTER TOOL

[76] Inventor: Nils Nygards, 7435 Hwy. 65 N.E., Minneapolis, Minn. 55432

[21] Appl. No.: 438,326

[22] Filed: Nov. 16, 1989

Related U.S. Application Data

[63] Continuation-in-part of Ser. No. 317,637, Mar. 1, 1989, abandoned.

[51] Int. Cl.$^5$ ............................................. B23B 3/22
[52] U.S. Cl. ................................... 408/82; 30/500; 30/172
[58] Field of Search ................ 408/82, 83.5, 227, 228, 408/22, 24, 30, 223, 201, 224, 225, 206, 714, 213; 409/138, 139, 140; 30/500, 172

[56] References Cited

U.S. PATENT DOCUMENTS

| | | | |
|---|---|---|---|
| 976,635 | 11/1910 | Cobb | 408/79 |
| 1,667,218 | 4/1928 | Purnig | 408/225 X |
| 1,677,465 | 7/1928 | Thaete | 408/81 X |
| 2,677,309 | 5/1954 | Koons | 408/835 |
| 4,440,531 | 4/1984 | Astle | 408/82 |
| 4,630,694 | 12/1986 | Walton et al. | 408/82 X |
| 4,693,643 | 9/1987 | Heyworth | 408/82 |
| 4,917,550 | 4/1990 | Aurentz | 408/225 |

FOREIGN PATENT DOCUMENTS 2010708 7/1979 United Kingdom ............... 408/201

Primary Examiner—Gary F. Paumen
Assistant Examiner—Robert Schultz
Attorney, Agent, or Firm—Faegre & Benson

[57] ABSTRACT

A self-centering plastic pipe router tool is described for routing of a sawed-off end of pipe from the interior surface of a salvageable pipe. The router tool is a disk with an axial shank on one side of the disk. A pair of cutting flanges extend radially outwardly and upwardly in the direction of the axial shank from the disk perimeter to form first and second cutting edges. A concentric cylindrical skirt extends downwardly from the disk for axial centering of the router tool within the waste pipe ID. The first cutting edges are sized for routing of the waste pipe and the second cutting edges are sized to plane and re-finish the interior surface of the salvageable pipe for re-use.

5 Claims, 3 Drawing Sheets

U.S. Patent   Mar. 19, 1991   Sheet 1 of 3   5,000,629
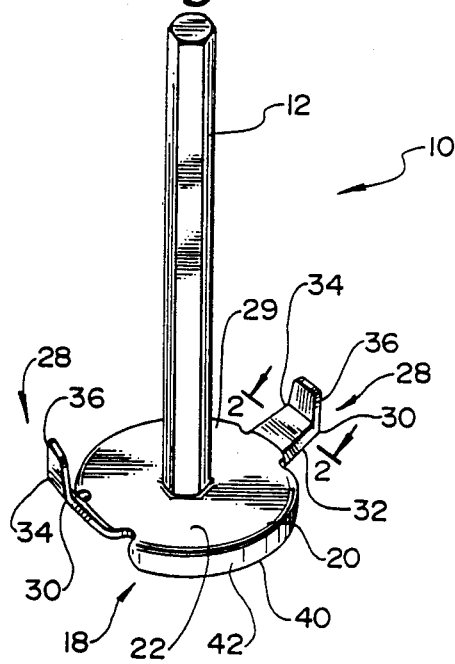
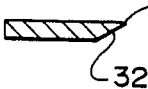
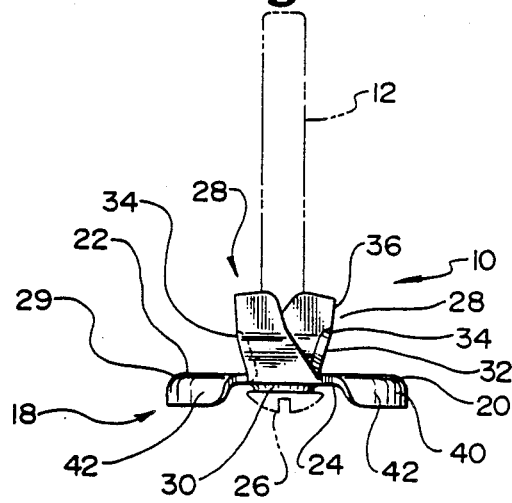
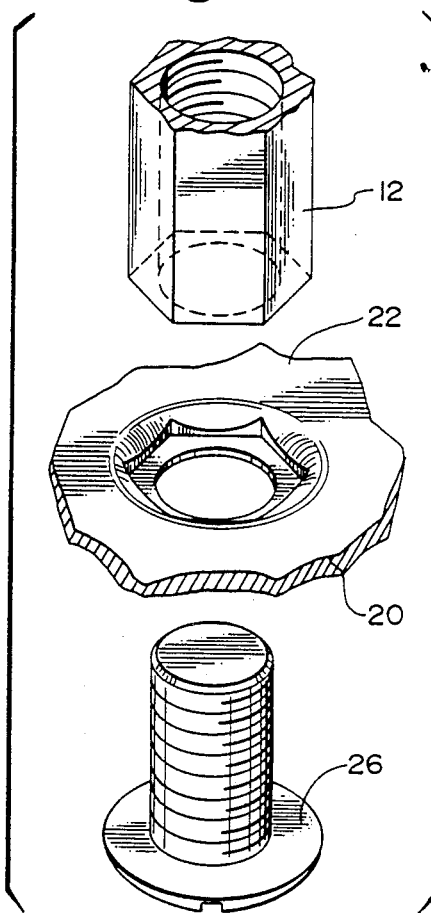

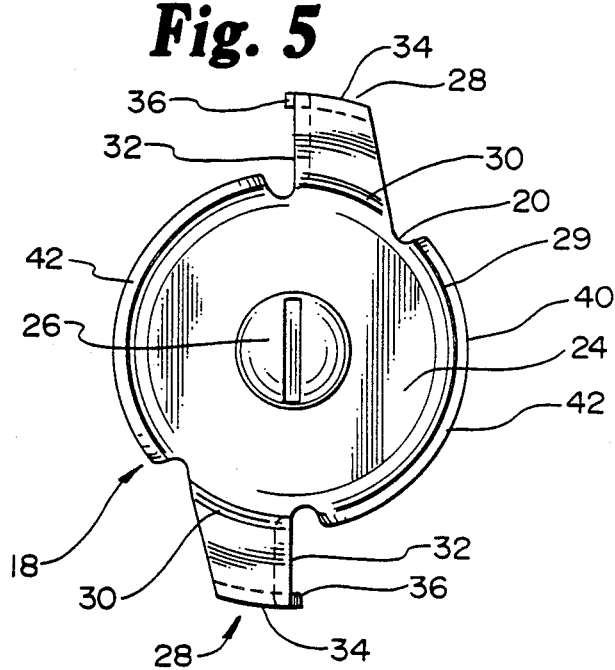
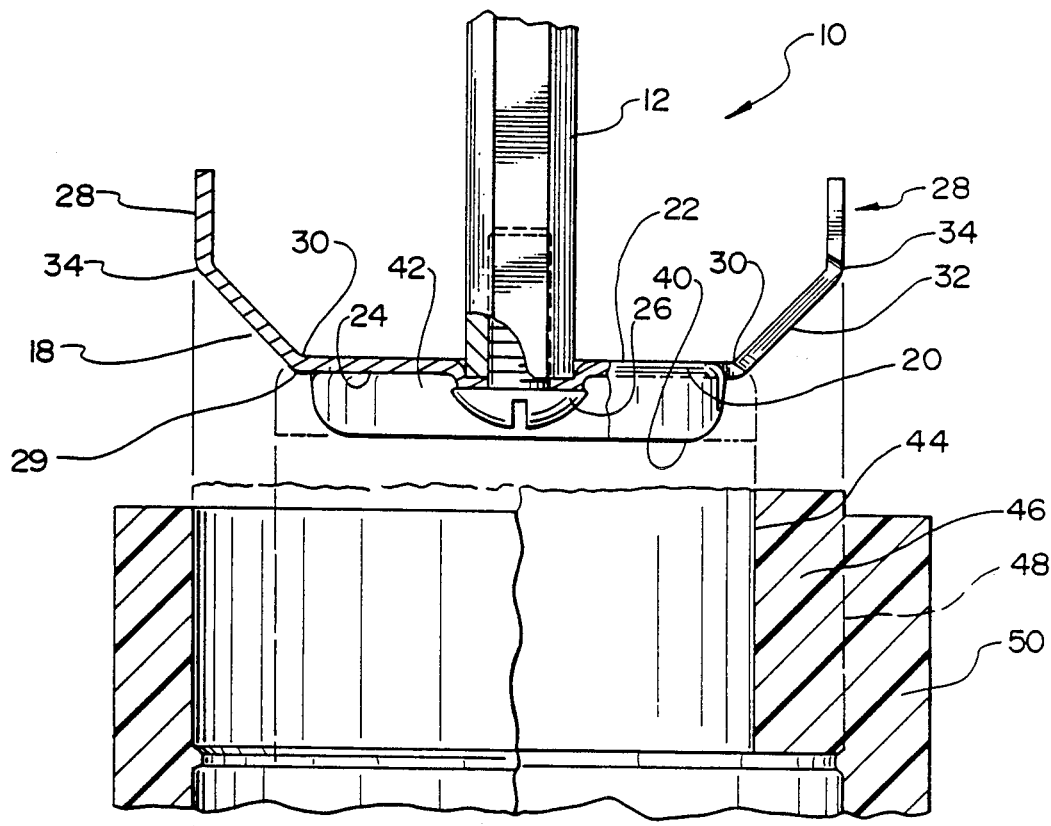

SELF-CENTERING PLASTIC PIPE ROUTER TOOL

CROSS-REFERENCE TO RELATED APPLICATION

This application is a continuation-in-part of my co-pending application Ser. No. 07/317,637, filed Mar. 1, 1989 and now abandoned.

BACKGROUND OF THE INVENTION

This invention relates to a self-centering router tool for use with a standard hand drill for routing of a waste end segment of a plastic pipe adhered to the interior surface of a salvageable plastic pipe or pipe fitting. More particularly, the present router tool enables the waste end plastic pipe segment to be completely and cleanly removed, while at the same time planing and re-finishing the inside surface of the salvageable plastic pipe or pipe fitting in condition ready to be reused.

With many types of piping, particularly plastic or synthetic resin piping, joining of the pipes is effected by cementing a first pipe, of uniform cylindrical diameter sized to fit within the interior diameter to an expanded terminal collar of a second pipe or pipe fitting, using an appropriate permanent adhesive. When it is necessary to separate the two pipes, the first pipe must be sawed off adjacent the expanded terminal collar. The two pipes cannot be easily separated from each other, since the adhesive used has permanent fixative qualities. It is highly desirable to be able to completely and cleanly remove the sawed-off end of the first pipe from the interior of the second pipe to permit re-use of the second pipe, thus avoiding the necessity of having to replace the second pipe as well. Often this second pipe is a specially designed fitting, such as a sanitary tee, which it would be highly desirable to remain in place or to salvage for re-use.

Various devices have been suggested for the purpose of enabling refinishing and replaning pipes and pipe fittings in such situations.

U.S. Pat. No. 4,440,531, issued Apr. 3, 1984 to Astle for REAMING AND COUNTERBORING CUTTING TOOL describes a rotary reaming and counterboring tool for reaming out an old weld area between a tube and a bore of a header into which the tube has been welded from within the interior of the header. However, this device can only be used with a special rotating driving tool head. The router tool of this invention, on the other hand, can be used with any ordinary hand drill. The Astle tool has a complicated radially spaced array of longitudinal cutting edges, interspaced with recesses, requiring highly technical and expensive tooling to manufacture. By contrast, the present novel router tool is rather simple and relatively inexpensive, while being totally effective and easy to use.

U.S. Pat. No. 4,693,643, issued Sept. 15, 1987 to Heyworth for PLASTIC PIPE PLANING DEVICE describes a tool which can perform two functions. The Heyworth tool can be used for cutting or planing the end of a plastic pipe, leaving the cut end flat and perpendicular to the pipe axis. The Heyworth tool can also be used for reaming out a piece of plastic pipe adhered within a plastic pipe fitting, so that the plastic pipe fitting is at the same time replanned and resurfaced for reuse. Again, the Heyworth tool is rather complicated and involved, requiring lengthy and expensive tooling to manufacture. The present inventive router tool is simple, inexpensive and relatively easy to manufacture, and performs its function with time and cost saving speed and efficiency. The present tool can be used with a standard hand drill to completely and cleanly remove the sawed-off end of an interior pipe, while at the same time planing and re-finishing the inside surface of the exterior pipe or pipe fitting in condition ready for re-use.

SUMMARY OF THE INVENTION

A self-centering plastic pipe router tool comprises a longitudinal axial shank for securing the router tool to the chuck of a standard hand drill. The router tool has a router head in the form of a disk. The disk has a proximal and a distal face and the shank is axially attached to the proximal face of the disk. The disk is integrally formed with a plurality of knife edge cutter blades extending radially outward from the disk perimeter. Each blade is bent radially proximally at a first position, at essentially the perimeter of the disk, to form a first cutting edge, of an angle intermediate the planar proximal face of the disk and the longitudinal axis of the shank. Each blade is also bent further proximally at a second position, closer to the tip end of the blade, to form a second cutting edge essentially parallel to the longitudinal axis of the shank. The disk has a self-centering skirt means extending distally from the distal face of the disk, substantially cylindrically concentric with the disk perimeter and axially concentric with the longitudinal axis of the shank.

The present novel router tool is designed to be retained by its shank within the chuck of a standard hand drill for routing of a waste end segment of a plastic pipe adhered to the interior surface of a salvageable plastic pipe or pipe fitting. The self-centering skirt is sized to the waste pipe interior diameter to axially center the router tool therewith. The first cutting edges are sized and adapted for routing of the waste pipe. The second cutting edges are sized and adapted to plane and re-finish the interior surface of the salvageable pipe or pipe fitting.

BRIEF DESCRIPTION OF THE DRAWINGS

FIG. 1 is a perspective view of the present novel self-centering plastic pipe router tool.

FIG. 2 is a sectional detail taken along line 2-2 in FIG. 1 and slightly enlarged, illustrating the knife cutting edge of the cutter blade.

FIG. 3 is a side elevational view of the router head portion of the present router tool, with the remaining structure shown in phantom line.

FIG. 4 is an enlarged fragmentary exploded view of the present router tool.

FIG. 5 is a bottom plan view of the present router tool.

FIG. 6 is a fragmentary side elevational view of the present router tool, showing workpieces before and after routing, with parts broken away.

DETAILED DESCRIPTION OF THE PREFERRED EMBODIMENT

Figure 7:
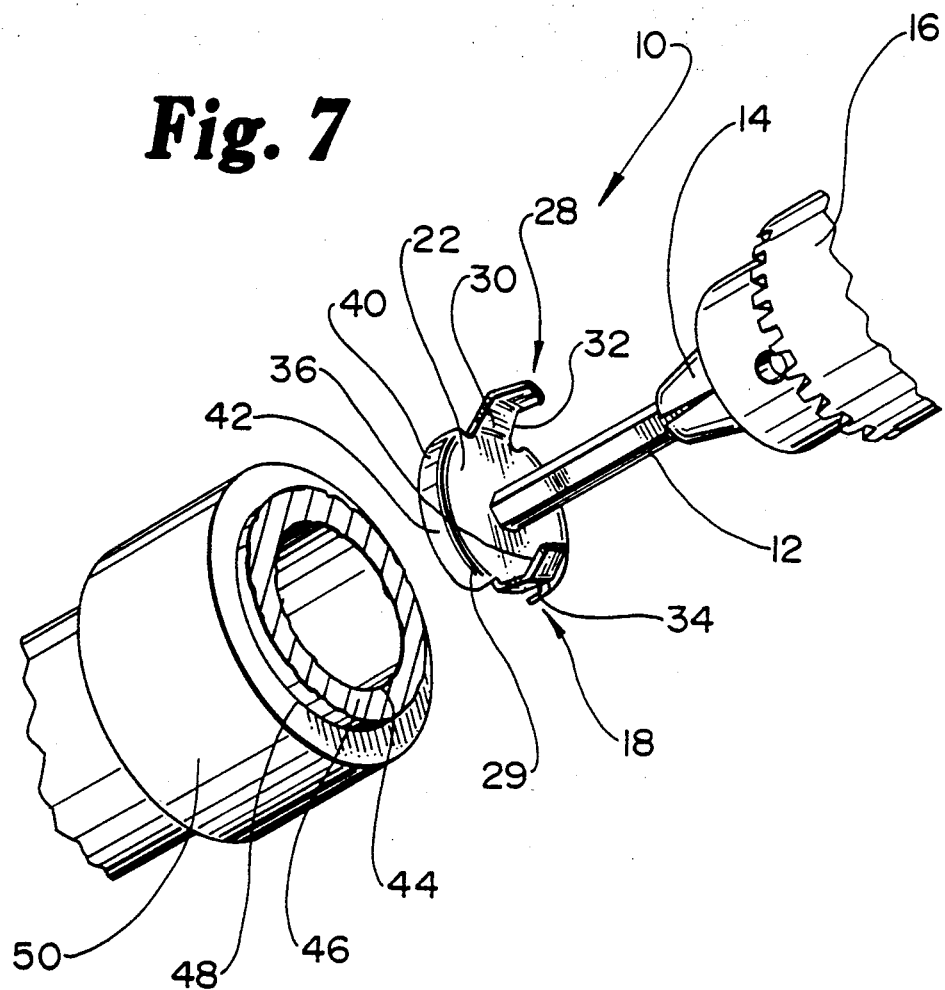
FIG. 7 illustrates the router tool of this invention in position preparatory to use.

The self-centering plastic pipe router tool 10 of this invention is shown in a perspective view in FIG. 1. Router tool 10 comprises longitudinal axial shank 12 for securing router tool 10 to chuck 14 of standard hand drill 16, as illustrated in FIG. 7. Router tool 10 has router head 18 in the form of disk 20. Disk 20 has proximal 22 and distal faces 24, and shank 12 is axially attached to proximal face 22 of disk 20, as by screw 26, accessible on distal face 24 of disk 20, as illustrated in FIGS. 3, 4, 5 and 6. Machined fitting of hexagonal shank 12 to proximal face 22 of disk 20 of router head 18 is illustrated in detail in FIG. 4. Router head 18 is integrally formed with a plurality of cutter blades 28 extending radially outward from perimeter 29 of disk 20. Each blade 28 is formed with a first bend 30, at which blade 28 is bent radially proximally at essentially the perimeter 29 of disk 20 to form first knife edge cutting edge 32 at an angle intermediate planar proximal face 22 of disk 20 and the longitudinal axis of the shank 12. Each blade 28 is also formed with second bend 34, at which blade 29 is bent further proximally to form second blunt cutting edge 36 essentially parallel to the longitudinal axis of shank 12. Cutting edge 32 is preferably formed with knife edge 38, as illustrated in FIG. 2. Cutter blades 28 are each raked in the direction of rotation of drill 16, as illustrated in FIGS. 3 and 5, to provide enhanced cutting effectiveness of router tool 10. Router head 18 has self-centering skirt means 40 extending distally from distal face 24 of disk 20, substantially cylindrically concentric with disk perimeter 29 and axially concentric with the longitudinal axis of shank 12. As illustrated in FIGS. 1, 3, 6 and 7, the skirt means 40 preferably is a pair of diametrically opposite mirror image skirts 42 intermediate cutter blades 28. However, any number of skirts 42 may be used, according to the number of cutter blades 28. As shown in FIGS. 1, 3 and 5 to 7, a pair of cutter blades 28 extend radially outwardly and distally from disk perimeter 29. However, any multiple of cutter blades 28 may be used, evenly spaced around disk perimeter 29. Router head 18 may be formed in one piece with shank 12 or may be removably secured thereto, for example, by screw means 26 accessible on distal face 24 of disk 20. Screw attachment allows router head 18 to be removed and exchanged when the cutter blades have become worn.

In use, longitudinal shank 12 of present inventive router tool 10 is secured within chuck 14 of standard hand drill 16, in the manner illustrated in FIG. 7. Advantageously, shank 12 is hexagonal in cross-section to facilitate secure retention within hand drill chuck 14. Skirt means 40 is sized to interior diameter 44 of the sawed-off end of waste pipe 46 to be removed from interior surface 48 of salvageable pipe 50, in order to provide axial centering of router tool 10 during positioning and during routing. When hand drill 16 is actuated, cutting edges 32 of rotating cutter blades 28 route out and remove the waste end of pipe 46, while cutting edges 36 plane and re-finish interior surface 48 of salvageable pipe 50. Thus, salvageable pipe 50 is prepared in condition ready for re-use.

The router tool of this invention can be sized for use with pipes of any given diameters, with skirt means 40 sized to fit interior diameter 44 of sawed-off end of waste pipe 46, second cutting edges 36 sized to plane and re-finish interior surface 48 of salvageable pipe 50, and first cutting edges 32 sized to route out waste pipe 46. Typical sizes of pipes with which the router tool of this invention may be used are 1" through 4" nominal. The router tool may be formed of any material sufficient to withstand the rotating pressure and be formed to cutting edges to effect the desired routing and resurfacing action, such as tempered spring steel. The router tool may be used for routing and resurfacing pipes formed of a variety of plastic and synthetic resin materials, including PVC and ABS.

What is claimed is:

1. A router tool comprising:
    a disk having a proximal and a distal face, and having multiple cutting flanges extending from the disk perimeter, each flange bent radially proximally at a first position, at essentially the perimeter of the disk, to form a first cutting edge, of an angle intermediate the disk proximal face and a longitudinal axis of a shank axially attached to the disk proximal face and each flange also bent further proximally at a second position, closer to a tip end of the flange, to form a second cutting edge essentially parallel to the longitudinal axis of the shank, and having a skirt means extending distally from the disk substantially cylindrically concentric with the disk perimeter; and
    a longitudinal shank axially attached to the proximal face of the disk for operative rotation therewith;
    the tool adapted to be operatively retained by the shank thereof by a standard hand drill for routing of a waste end segment of a plastic pipe adhered to the interior surface of a salvageable plastic pipe, such that the skirt is sized to the waste pipe interior diameter for axially centering the router tool therewith, the first cutting edges are sized and adapted for routing of the waste pipe and the second cutting edges are sized and adapted to plane and re-finish the interior surface of the salvageable pipe.

2. A router tool according to claim 1, wherein the cutting flanges are a pair of diametrically opposite mirror image cutting flanges and the skirt means is a pair of diametrically opposite mirror image skirts intermediate the cutting flanges.

3. A router tool according to claim 2, wherein the disk is removably secured to the shank by screw attachment means.

4. A router tool comprising:
    a longitudinal axial shank; and
    a router head in the form of a disk, said disk having a planar proximal and a planar distal face, said shank terminally axially attached to the proximal face of said disk for operative rotation therewith, said disk integrally formed with a plurality of knife edge cutter blades extending radially outward from the disk perimeter, each blade having a first bend radially proximally at essentially the perimeter of the disk to form a first cutting edge at an angle intermediate the planar proximal face of the disk and the longitudinal axis of the shank, and each blade also having a second bend further proximally intermediate the first bend and a tip end of the blade to form a second cutting edge essentially parallel to the longitudinal axis of the shank, the cutter blades are slightly raked in direction of rotation of the standard hand drill, the cutter blades are a pair of diametrically opposite mirror image cutter blades, and said disk having a self-centering skirt means extending distally from the disk distal face, said skirt means substantially cylindrically concentric with the disk perimeter and said skirt means axially concentric with the longitudinal axis of the shank, the skirt means is a pair of diametrically opposite mirror image skirts intermediate the cutter blades;
    the tool adapted to be operatively retained by the shank thereof by a standard hand drill for routing of a waste end segment of plastic pipe adhered to the interior surface of a salvageable plastic pipe, such that the skirt is sized to the waste pipe interior diameter for axially centering the router tool therewith, the first cutting edges are sized and adapted for routing of the waste pipe and the second cutting edges are sized and adapted to plane and re-finish the interior surface of the salvageable pipe.

5. A router tool according to claim 4, wherein the router head is removably secured to thank terminus by screw attachment means accessible on the disk distal face.

* * * * *

UNITED STATES PATENT AND TRADEMARK OFFICE
CERTIFICATE OF CORRECTION

PATENT NO. : 5,000,629

DATED : March 19, 1991

INVENTOR(S) : Nils Nygards

It is certified that error appears in the above-identified patent and that said Letters Patent is hereby corrected as shown below:

Col. 6, claim 5, line 4, delete "thank" and insert --shank--.

Signed and Sealed this

Twenty-fifth Day of August, 1992

Attest:

DOUGLAS B. COMER

Attesting Officer

Acting Commissioner of Patents and Trademarks